United States Patent

Bortoluzzi et al.

Patent Number: 5,215,695
Date of Patent: Jun. 1, 1993

[54] PROCESS FOR RECLAIMING THE RESIDUALS OF THE MANUFACTURE OF HIGH PRESSURE LAMINATES

[75] Inventors: Claudio Bortoluzzi, Arenzano; Raffaele Bogana, Bra, both of Italy

[73] Assignee: Abet Laminati S.p.A., Italy

[21] Appl. No.: 834,830

[22] Filed: Feb. 13, 1992

Related U.S. Application Data

[63] Continuation-in-part of Ser. No. 498,648, Mar. 26, 1990, abandoned.

[30] Foreign Application Priority Data

Apr. 19, 1989 [IT] Italy ............................... 67284 A/89

[51] Int. Cl.[5] ...................... B29C 35/02; B29C 47/00
[52] U.S. Cl. ................................... 264/102; 264/115; 264/122; 264/126; 264/140; 264/162; 264/163; 264/210.6; 264/211; 264/211.24; 264/331.22; 264/349; 264/DIG. 69; 425/DIG. 46; 428/903.3
[58] Field of Search ................. 264/37, 109, 122, 115, 264/101, 102, 211.24, DIG. 69, 39, 211, 171, 126, 331.22, 210.6, 140, 163, 162, 349; 425/DIG. 46; 428/903.3

[56] References Cited

U.S. PATENT DOCUMENTS

| | | |
|---|---|---|
| 3,578,523 | 5/1971 | Ohse . |
| 3,671,515 | 6/1972 | Cox et al. . |
| 3,671,615 | 6/1972 | Price ........................ 264/39 |
| 3,956,541 | 5/1976 | Pringle . |
| 4,086,125 | 4/1978 | Vasishth et al. . |
| 4,098,649 | 7/1978 | Redker ...................... 264/DIG. 69 |
| 4,100,328 | 7/1978 | Gallagher . |
| 4,225,640 | 9/1980 | Erb . |
| 4,228,116 | 10/1980 | Colombo et al. . |
| 4,468,264 | 8/1984 | Clarke et al. ........................ 264/37 |
| 4,894,192 | 1/1990 | Warych . |

FOREIGN PATENT DOCUMENTS

| | | | |
|---|---|---|---|
| 57-140122 | 8/1982 | Japan ................................... 264/37 |
| 60-234830 | 11/1985 | Japan ................................... 264/37 |

*Primary Examiner*—Jeffery Thurlow
*Assistant Examiner*—Mathieu Vargot
*Attorney, Agent, or Firm*—Burns, Doane, Swecker & Mathis

[57] ABSTRACT

A process for reclaiming residuals produced from the manufacture of decorative high pressure laminates (HPLs), and composite materials obtained by the process. Such residuals which include cellulose impregnated with thermosetting resins which are partially condensed, are ground to a predetermined particle size and mixed with a melted mass of thermoplastic resin under controlled pressure and temperature conditions. The mixing time is sufficiently long for completion of the reaction during which physical and chemical interactions occur between the partially polycondensed thermosetting resin and the thermoplastic resin. The material so produced can be converted into granules for subsequent injection molding. There is provided an effective solution to pollution problems and excessive expense problems associated with the disposal of scraps and residuals from the manufacture of decorative HPLs.

6 Claims, 1 Drawing Sheet

# PROCESS FOR RECLAIMING THE RESIDUALS OF THE MANUFACTURE OF HIGH PRESSURE LAMINATES

RELATED APPLICATIONS

This application is a continuation-in-part application of U.S. patent application Ser. No. 07/498,648 filed on Mar. 26, 1990, entitled "A Process For Manufacturing a Composite Material Comprising Thermoplastic Polymers and Residuals From the Manufacture of Plastic Laminates, and the Composite Material So Obtained", now abandoned.

BACKGROUND OF THE INVENTION

This invention relates to a process for reclaiming residuals produced from the manufacture of decorative high pressure laminates (HPLs), as well as to composite materials obtained by the process.

A decorative HPL is defined by ISO 4586-1 (1987) point 3 as a sheet of layers of paper impregnated with thermosetting resins, the core layers being impregnated with phenolic resins and a surface layer or layers impregnated with aminoplastic resins, and bonded together by means of heat and pressure of not less than 5 MPa, the outer layer or layers on one or both sides having decorative colors or designs.

In manufacturing such plastic laminates for ornamental purposes, a large amount of residuals and scraps of material are produced which must be disposed of. The scrap material mainly finds its origin from the contours of the impregnated paper stack which protrude from the press plates and are trimmed away, paper cutouts produced during various impregnation steps, and powders and/or chips produced upon grinding and/or milling the laminate back side for better glue adhesion in later applications. The disposal of these residuals obviously raises possible environmental pollution problems, as well as cost burdens on the laminate manufacturer.

SUMMARY AND OBJECTS OF THE INVENTION

Accordingly one object of the present invention is to provide and effective solution to the aforementioned pollution problems and excessive expense problems associated with the disposal of scraps and residuals from the manufacture of decorative HPLs.

Another object of the present invention is to provide commercial value to scraps and residuals from the manufacture of decorative HPLs, by converting them into a material suitable for thermoforming with good technological properties, and which is useful for numerous applications.

The above, and other objects and advantages of the invention as will become evident from the description below, can be achieved by means of a process for reclaiming the residuals produced during the manufacture of decorative HPLs. The process includes the steps of:

(i) preparing a feed material of scraps from different steps involved in the manufacture of HPLs (particularly those scraps produced upon trimming the contours of an impregnated paper stack which protrude from the press plates, those cutout scraps produced from the paper during various impregnation steps, and scraps of powders and/or chips produced upon grinding and/or milling of the laminate back side), the feed material comprising at least 50% by weight of cellulose partially impregnated with polycondensed thermosetting resin(s) and at least 20% by weight of partially condensed impregnating thermosetting resin(s), the partially condensed thermosetting resin(s) impregnating the cellulose;

(ii) grinding the feed material and producing a powder of particles having a predetermined size and a lower degree of moisture relative to the product of the previous step;

(iii) preparing a melted mass of thermoplastic material;

(iv) maintaining the powder of feed material at a temperature ranging from 130° and 260° C., and a pressure ranging from 60 to 90 kg/cm$^2$, while mixing the powder with the melted mass of thermoplastic material, and completing polycondensation of the impregnating partially polycondensed thermosetting resin(s);

(v) degassing the mass resulting from step (iv) to release any formaldehyde and the other volatile products generated during the completion of polycondensation of the impregnating partially polycondensed thermosetting resin(s);

(vi) forming and cooling semifinished articles from the degassed mass.

A more detailed description of preferred embodiments of the invention is set forth below and with reference also to the attached drawings.

DESCRIPTION OF PREFERRED EMBODIMENTS

The process of the invention permits increased utilization of, and provides increased value for, those residuals, scraps and wastes of laminates and/or components thereof which are produced in the manufacture of decorative high pressure laminates (HPLs).

The material obtained by the invention used alone, or coupled with compatible coverings, has been found particularly suitable for many purposes such as the realization of coachworks, parts of furniture, separation panels for building, various technical articles and plain or three-dimensional objects.

Until now the scraps and laminate residuals utilized in the present invention served no useful purpose and were simply disposed of, resulting in evident cost and environmental pollution problems. Now by the process of the invention the reactive properties of those by-products are advantageously exploited for producing composite materials having good technological properties, through mixing, heating and extrusion with a thermoplastic polymer.

It has also been discovered that because of the particular physical and chemical characteristics of the by-products, more economic processes for the preparation of composite products can be obtained compared to other passive and inert residuals. The feed material used in the process of the invention not only provides a passive filler material, but acts, cooperates and then transforms itself into a chemically and physically different material at the end of the process during which volatile substances are liberated.

The laminate scraps produced in the manufacture of decorative HPLs have shapes and sizes which are quite variable, e.g., can be in the form of cutouts or cuttings with an area of several square centimeters and larger, or in the form of powders and chips produced by the abrasion of the laminate rear face. Therefore, the first operation to be accomplished after obtaining the starting material containing the aforementioned wastes, is a grinding of the material. This provides a particle size which is small enough, and a suitably homogeneous distribution of paper particles impregnated with partially polycondensed resin, for subsequent treatment.

Figure 1:
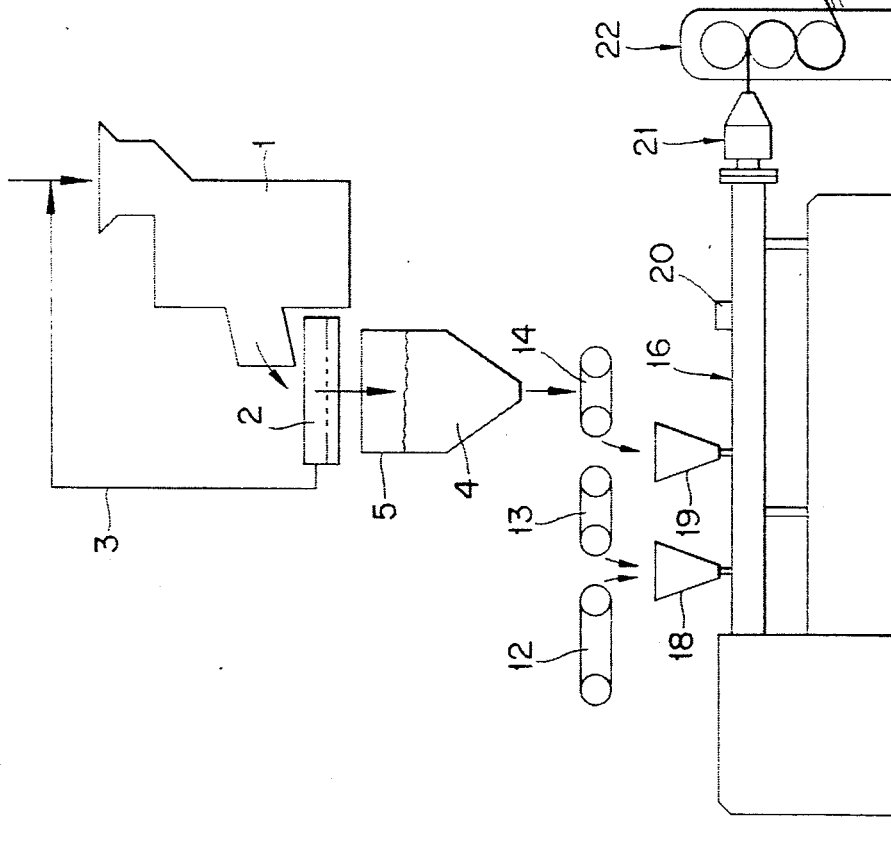
FIG. 1 is a diagram of a suitable plant for carrying out the process of the invention.

With reference to FIG. 1, the scraps, residuals and/or by-products from the manufacture of decorative HPLs which have been collected and mixed in the first step of the process, are carried to a mill I, (e.g., a hammer mill) and are ground to a particle size smaller than 1 mm, preferably to an average particle size of 0.3 mm. In this regard, the ground material at the outlet of mill 1 is carried to a screen 2, with the unsuitably large particles being returned to mill 1 through recirculation at 3. In the grinding step a certain amount of heat is generated. This heat at least partially dries the material if any moisture is present.

The ground and conditioned material 4 is stored in a hopper 5 and carried to the mixing step through a gravity proportioning device 14.

Figure 2:
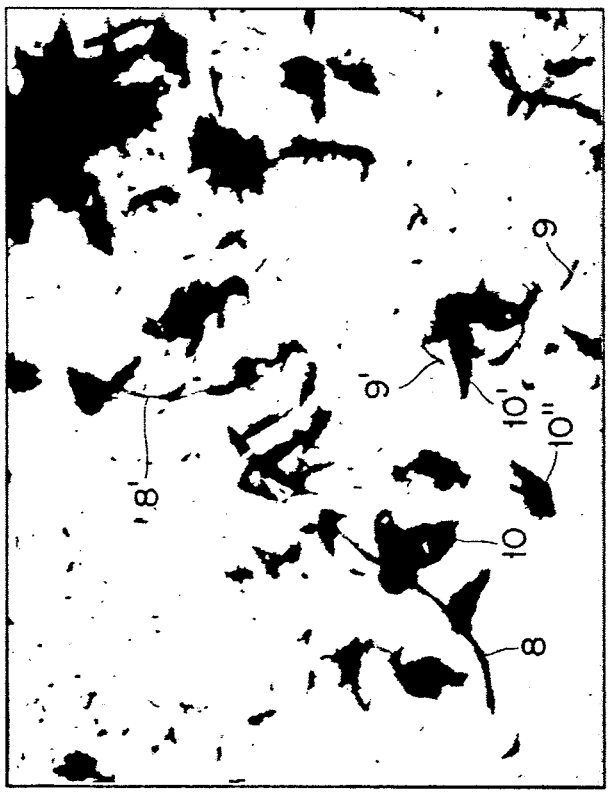
FIG. 2 is a photomicrograph of the ground scrap material used in the process of the present invention.

The photomicrograph of FIG. 2 shows, 50 times enlarged, the characteristics of the so treated material.

It has been found that residuals from the manufacture of decorative HPLs derived from the contours of the impregnated paper stack protruding from the press plates, from paper cutouts, from powders and chips produced when grinding or milling the laminate back side, comprise on the average:

about 20% by weight of pearls and sphere-like bodies such as 10,10',10" of paper impregnating partially polycondensed thermosetting resin with other fibers and fibrils not visible in FIG. 2; and about 50% by weight of fibers 8,8', fibrils 9,9' and particles of cellulose having an irregular shape partially impregnated with completely polycondensed thermosetting resin.

During the grinding step the resin(s), which is (are) quite brittle, is (are) crushed, partially exposing the cellulose fibers and fibrils having a high specific strength. As a result, cellulose-resin aggregates having a large specific surface are obtained.

As already pointed out, the paper impregnating resin is a thermosetting resin, mainly phenolic and melaminic resins, the former being used for impregnating the foil of paper, the latter for impregnating the outer ornamental sheet, the paper being impregnated with resins in a continuous bath.

In the scrap material employed as a feed material for the process of the invention, at least a portion of the abovementioned phenolic and melaminic resins are only partially polycondensed; i.e., they are not in the final condensation stage between phenol or derivative thereof, and formaldehyde, and melamine or derivative thereof and formaldehyde. They have not been completely subjected to the temperature and pressure conditions which cause complete polycondensation of the impregnation resins which during laminate pressing impart the final hardness and stability properties to the laminate. The scrap material primarily originates from trimming the edges of paper stacks upon pressing, which have not been subjected either to the high pressures of the press, or to the temperatures existing therein. Thus, the scraps are in an intermediate stage of polycondensation.

Due to this characteristic of the resin component, the presence in the paper particles of only partially polycondensed thermosetting resin(s) provides more than a passive presence. The mixture shows reactive properties with respect to the thermoplastic resin(s) during heating and pressing of the melted mass.

The other essential component of the composite material which is produced by the process of the invention is a thermoplastic polymer or a mixture of thermoplastic polymers. Preferred thermoplastic polymers include polyethylene, polypropylene, polyvinyl chloride, acrylonitrile-butadiene-styrene (ABS) and acetal resins.

Moreover, known additives can be used. For example, some antioxidants can be used to stabilize the product in the time. One such antioxidant is 3-(3,5-ditertiobutyl-4-hydroxyphenyl)-n-octodecyl propionate. Also, some lubricants can be used to ease the formation of sheets of semi-finished products. One such lubricant is calcium stearate.

In order to modify and improve the characteristics of the final product, other components can be added to the thermoplastic resin/laminate scrap powder mixture, such as foaming agents, fiber or amorphous mineral fillers, inert organic fillers, pigments, microspheres, and shock-resistant agents. These can be added in an amount compatible with the stability of the base mixture of laminate scraps and thermoplastic resin(s).

The thermoplastic resin(s) and the additives are introduced through a feeding hopper 18 (after proper dosing by the gravity proportioning devices 12 and 13, the former for the thermoplastic resin and the latter for the additives) into a suitable apparatus, preferably an extruder 16, for mixing and melting the resins and additives.

In the path between the extruder entry point from hopper 18 and the extruder entry point from hopper 19, the complete melting of the thermoplastic components and the complete mixing of the thermoplastic components with the additives must be achieved.

Through hopper 19 the ground powder of scraps from decorative high pressure laminates is then introduced into the mass of thermoplastic resin(s) already melted and completely mixed with the additives. Suitable proportioning of the powder can be obtained by gravity proportioning device 14.

When added into the melted mass of thermoplastic resins and additives, which is maintained at a temperature ranging from 130° and 260° C., the partially polycondensed resin contained in the paper particles of the mixture of ground powder mixture from HPL scraps further reacts and condenses completely. The further reaction has two significant effects which have been considered in the process definition; the first being that the reaction is exothermic and the second being that a considerable amount of formaldehyde is generated.

Due to the fact that the local temperature in the zone where the partially polycondensed resins are present is higher than the melted mass average temperature, further reactions of polycondensation are possible, particularly with respect to those partially polycondensed thermosetting resins whose degree of condensation is close to the complete degree of condensation.

The relative amounts of the thermoplastic polymer, laminate scraps and additives can change according to the characteristics of the desired final product. However, the thermoplastic polymer should be at least 20% by weight of the overall mixture. A preferred amount of thermoplastic polymer ranges from 40% to 60% by weight of the overall mixture.

The mixture with the ground powder is carried out at a temperature ranging between 130° and 260° C.

Under the temperature and the pressure conditions of the process, the partially polycondensed thermosetting resin becomes completely reticulated. Nevertheless, as the fractions of the resins are homogeneously and finely distributed into the mass, the plasticity of the resulting material is not compromised.

The mixing time has to be sufficiently long for completion of the reaction which can be characterized generally by that of the phenolic resin:

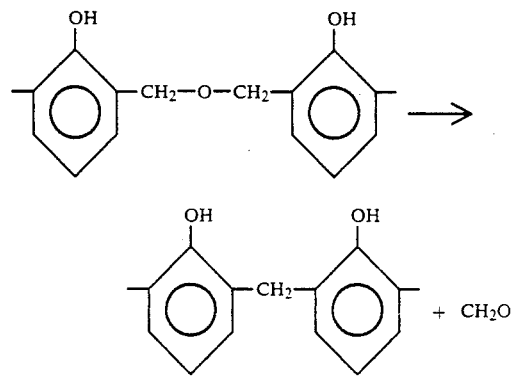

In the reaction above, (I) is the phenol-formaldehyde resin which has been polymerized to an intermediate stage and referred to as resistor, whereas (II) is the final product, unmeltable and insoluble, called resite. By the reaction, the ether bonds of the resistor are converted to methylene bonds, thereby generating formaldehyde. A quite similar reaction takes place for the melaminic resin.

During the exothermic, further polycondensation reaction of the partially polcondensed thermosetting resin(s), the following effects have been observed to occur in the mixture:

(a) a plastic reticulated structure is formed between the themosetting resin(s) and the thermoplastic resin(s);

(b) a decrease of the local viscosity of the thermoplastic polymer, as well as an increase in wetability of the thermosetting component; and (c) a release of formaldehyde.

Still referring to FIG. 1, the extruder 16 is equipped with a degassing opening 20 for releasing formaldehyde generated during the described reaction (which takes place between the extruder entry point from hopper 19 and degassing opening 20). Should there be a discharge from the extruder of the mixed mass in vacuum and an introduction of the plastic material into a second extruder or multiple calendar or different idoneus apparatus for making unfinished products, the degassing opening 20 can be placed near the opening at the end of the extruder.

The obtained unfinished products can be treated in order to maintain their shape, cooled and finally cut to desired dimensions using known devices for those functions.

According to the embodiment illustrated in FIG. 1, the mass coming from the extruder is extruded through a die 21, compacted by a calendar 22, cooled and cut in air cooling and cutting stations 23 and 24, respectively.

The following data relates to, and illustrates, some specific embodiments of the invention, but should not be construed as limiting the invention in any way.

EXAMPLE 1

Scraps of decorative HPL were used having the following average composition by weight:

| | |
|---|---|
| Cellulose (from Kraft paper) | 63% |
| Phenolic resin (resitols) | 18% |
| Phenolic resin (resites) | 7% |
| Melaminic resin | 6% |
| Mineral inerts | 6% |

The scraps were ground in a hammer mill and screened to obtain the following particle sizes:

| Screen Mesh Opening (mm) | % by weight |
|---|---|
| <0.8 | 5 |
| <0.5 | 18 |
| <0.3 | 10 |
| <0.2 | 34 |
| <0.1 | 33 |

Polypropylene homopolymer with a fluidity index of 3 was used as the thermoplastic polymer.

Moreover, a mixture of additives was prepared containing:

| | |
|---|---|
| 3-(3,5-ditertiobutyl-4-hydroxyphenyl)-n-octodecyl propionate | 5%; |
| calcium stearate | 20%; and |
| talc | 75% |

The laminate scraps, the propylene and the mixture of additives above were continuously fed through gravity proportioning devices as shown in FIG. 1, at the following flow rates:

| | |
|---|---|
| powders and laminate scraps | 60 kg/h |
| polypropylene | 40 kg/h |
| additives | 4 kg/h |

The overall flow rate of the extruder was 104 kg/h, thus forming a mixture having the following composition:

| | |
|---|---|
| powder and laminate scraps | 57.69% |
| polypropylene | 38.46% |
| 3-(3,5-ditertiobutyl-4-hydroxyphenyl)-n-octodecyl propionate | 0.19% |
| calcium stearate | 0.78% |
| talc | 2.88% |

The extrusion temperature was 220° C.

EXAMPLE 2

The materials and the method of Example 1 were used, except for the addition to the laminate scrap material in the hopper 18 of 20% by weight of granulated cutouts of the composite material prepared in accordance With Example 1.

EXAMPLE 3

The materials of Example 1 were used in the same amounts as that example, except that a polypropylene homopolymer with a fluidity index of 12 instead of 3 was used as the thermoplastic polymer.

The sheet obtained was crumbled in a blade granulator rather than the cutting station 24 of FIG. 1, to obtain small cubes of about 3 mm of composite materials adapted to feed an injection molding press.

With the intent of verifying the advantages offered by the process of the invention, the characteristics of different products obtained with the above-described plant from different feed materials were considered.

Four different samples were prepared using the following feed materials:

TABLE 1

| SAMPLE | COMPOSITION | % |
|---|---|---|
| A | Polypropylene with melt flow index of 3 | 48.4 |
|   | Mixture of scraps as in Example 1 | 48.4 |
|   | Additives as in Example 1 | 3.2 |
| B | Polypropylene with melt flow index of 3 | 48.4 |
|   | Saw dust with average granulometry of 250μ | 48.4 |
|   | Additives as in Example 1 | 3.2 |
| C | Polypropylene with melt flow index of 3 | 58.3 |
|   | Industrial talc with average granulometry of 40μ | 38.4 |
|   | Additives as in Example 1 | 3.2 |
| D | Polypropylene with melt flow index of 3 | 48.4 |
|   | Ground HPL panels with average granulometry of 300μ | 48.4 |
|   | Additives as in Example 1 | 3.2 |

The chemical compositions of Sample A and Sample D were identical, except that the thermosetting resins contained in the mixture of scraps of Sample A were partially not in the final state of polycondensation while the thermosetting resins contained in the mixture of scraps of Sample D were completely polycondensed.

With reference to the data in Table 2 below, it is evident that the foils obtained with the residuals from the manufacture of HPLs (Sample A) show:

(a) higher isotropy with respect to Sample B in which the feed material has equivalent fibrousness;
(b) lower dimensional contraction with respect to Sample B during the hot-wet tests;
(c) lower water absorption with respect to Samples B and C; and
(d) higher resistance characteristics with respect to Sample D.

TABLE 2

| CHARACTERISTICS | DIRECTION | SAMPLES | | | |
|---|---|---|---|---|---|
|   |   | A | B | C | D |
| specific weight g/cm$^3$ | ///////// | 1.1 | 1.07 | 1.24 | 1.1 |
| water absorption % | ///////// | <0.5 | <3.0 | <1.0 | <0.5 |
| tensile strength | lengthwise | >19 | >17 | >20 | >17 |
| N/mm$^2$ | crosswise | >18 | >13 | >19 | >16 |
| flexural strength | lengthwise | >37 | >43 | >36 | >32 |
| N/mm$^2$ | crosswise | >35 | >33 | >33 | >30 |
| modulus of elasticity | lengthwise | >3.000 | >3.200 | >2.900 | >2.800 |
| under flexion N/mm$^2$ | crosswise | >2.800 | >2.200 | >2.600 | >2.600 |
| maximum deflection mm | lengthwise | >4 | >2.5 | >3 | >4 |
|   | crosswise | >4 | >3.5 | >3 | >4 |
| charpy impact | lengthwise | >0.25 | >0.34 | >0.35 | >0.20 |
| strength J/cm$^2$ | crosswise | >0.24 | >0.21 | >0.35 | >0.20 |
| heat distortion | lengthwise | >101 | >103 | >102 | >95 |
| temperature °C. | crosswise | >96 | >84 | >95 | >90 |
| hardness shore D | ///////// | >70 | >70 | >77 | >70 |
| 16 h, 90° C. resistance % | lengthwise | <0.1 | <0.5 | <0.1 | <0.1 |
|   | crosswise | <0.1 | <0.5 | <0.1 | <0.1 |
| 48 H, 55° C., 95% r.h. | lengthwise | <0.2 | <0.3 | <0.2 | <0.2 |
| resistance % | crosswise | <0.2 | <0.3 | <0.2 | <0.2 |

What is claimed is:

1. A process for reclaiming the residuals from the manufacture of high pressure laminates (HPLs), said process comprising the steps of:
   (i) providing a feed material comprising scraps from the manufacture of HPLs, said feed material comprising at least 50% by weight of cellulose partially impregnated with completely polycondensed thermosetting resin(s) and at least 20% by weight of partially polycondensed thermosetting resin(s);
   (ii) grinding the feed material and producing a powder comprising particles having a predetermined size and a lower degree of moisture relative to the feed material prepared in step (i) if moisture exists in the feed material;
   (iii) preparing a melted mass of thermoplastic material;
   (iv) mixing the ground feed material from step (ii) with the melted mass from step (iii), while maintaining the powder at a temperature ranging from 130° to 260° C. and pressure ranging from 60 to 90 kg/cm$^2$ thereby further polycondensing the partially polycondensed thermosetting resin(s) of the feed material;
   (v) degassing the mixed mass from step (iv) to release formaldehyde and the other volatile products generated during the further polycondensation of the partially polycondensed thermosetting resin(s); and
   (vi) forming semi-finished articles form the degassed mass and cooling said semi-finished articles.

2. A process according to claim 1, wherein the feed material comprises scraps produced during trimming of the contours of an impregnated paper stack protruding from press plates during HPL manufacture, scraps produced from cutouts of the paper from various impregnation steps, powders and chips produced during grinding or milling of the high pressure laminate back side.

3. A process according to claim 1, wherein in step (ii) a fine powder is produced comprising particles having particle sizes or diameters smaller than 4 mm.

4. A process according to claim 1, wherein said thermoplastic material is present in the mixture in an amount of from 30 to 60% by weight.

5. A process according to claim 1, wherein the thermoplastic material is selected from the group consisting of polyethylene resins, polypropylene resins, polyvinyl chloride resins, acrylonitrile-butadiene-styrene resins, acetal resins, and mixtures thereof.

6. A process according to claim 1, wherein a mixture between the powder of ground feed material and the mass of thermoplastic material is obtained by contemporary heating, pressing and mixing the components for a time sufficient to allow further polycondensation of the partially polycondensed thermosetting resin(s) present in the ground feed material.

* * * * *